United States Patent

Hageman

[15] 3,685,172
[45] Aug. 22, 1972

[54] EDUCATIONAL DEVICE

[72] Inventor: Kenneth C. Hageman, 2044 Glenco, Fort Worth, Tex. 76110

[22] Filed: Nov. 18, 1970

[21] Appl. No.: 90,525

[52] U.S. Cl. ..........................................35/48, 35/9
[51] Int. Cl. ...........................................G09b 3/02
[58] Field of Search ..............35/9 G, 9 H, 36, 37, 48

[56] References Cited

UNITED STATES PATENTS

| | | | |
|---|---|---|---|
| 3,516,177 | 6/1970 | Skinner | 35/9 G |
| 3,485,168 | 12/1969 | Martinson | 35/36 X |
| 3,302,306 | 2/1967 | Peterson | 35/9 H |
| 2,937,455 | 5/1960 | Perkins et al. | 35/9 R |
| 2,987,828 | 6/1961 | Skinner | 35/9 E |
| 3,413,735 | 12/1968 | Erbert | 35/48 R |

*Primary Examiner*—Robert W. Michell
*Assistant Examiner*—J. H. Wolff
*Attorney*—Wofford and Felsman

[57] ABSTRACT

An educational device characterized by an evaluation means such as a photoelectric cell for determining whether an answer is correct or incorrect in response to an absolute, rather than comparative, quantity of light transmitted through aligned correct answer areas and direct response registration areas. If the answer is acceptable, the problem, answer, and response means are advanced. If the response is determined to be incorrect, only the response registration means is advanced and the student is asked to repeat the problem. In one embodiment, an anti-frustration means is provided to advance to the next problem after a predetermined number of incorrect answers are registered. Also disclosed are specific structural and schematic features.

29 Claims, 22 Drawing Figures

PATENTED AUG 22 1972

INVENTOR
Kenneth C. Hageman
BY
Wofford & Felsman
ATTORNEYS

Fig. 7
Fig. 8
Fig. 9
Fig. 10

PATENTED AUG 22 1972 3,685,172

INVENTOR
Kenneth C. Hageman
BY
Wofford & Felsman
ATTORNEYS

PATENTED AUG 22 1972

INVENTOR
Kenneth C. Hageman
BY
Wofford & Felsman
ATTORNEYS

EDUCATIONAL DEVICE

BACKGROUND OF THE INVENTION

1. Field of the Invention

This invention relates to programmed instruction or question-and-answer games. More particularly, this invention relates to an educational device for effecting programmed instruction.

2. Description of the Prior Art

The prior art is replete with educational devices. The prior art devices range the gamut from simple devices for pre-school children in which a given question block will have matching electrical connections on an answer block to energize a lamp when the question and answer blocks are matched, to highly complex electronic teaching and testing stations interconnected in a network with a central broadcasting station. The prior art devices also include teaching and testing systems of intermediate complexity employing slide projectors to project material followed by question and answer sequences, having reversing relays, and offering the student a variety of programmed material in the form of slides projected on a screen by a projector. Despite the wide variety of devices offered, the prior art has failed to provide a simple, relatively inexpensive educational device that can be employed for programmed instruction with a repetition feature so that the student repeats a missed problem until he masters it; or until, as an anti-frustration measure, a predetermined number of incorrect answers have been registered. Frequently, the prior art educational devices were so elaborate and expensive as to be prohibitive for use by public school systems and the like.

DESCRIPTION OF PREFERRED EMBODIMENTS

It is a primary object of this invention to provide an economical educational device that obviates the disadvantages of the prior art devices and can be employed in effecting programmed learning at various levels of difficulty.

It is another object of this invention to provide an economical educational device effecting programmed instruction with the well recognized feature of having the student repeat a missed problem, but incorporating an anti-frustration means in which the student is advanced to the next problem after a predetermined number of incorrect answers are registered.

Other and specific objects will become apparent to those skilled in the art after consideration of the descriptive matter hereinafter in combination with the drawings.

Figure 1:
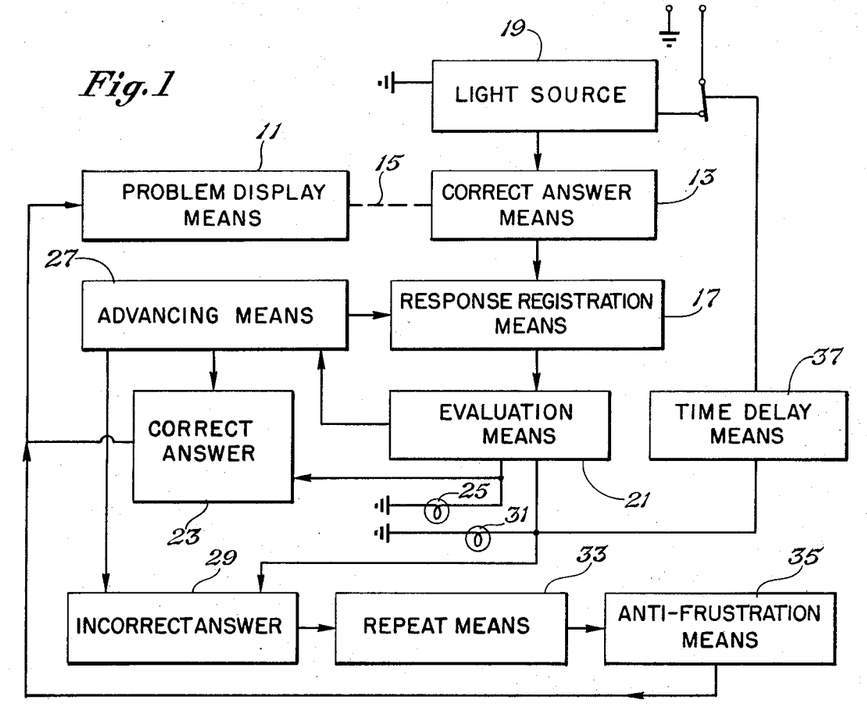
FIG. 1 is a schematic block diagram illustrating one embodiment of this invention.

One embodiment of this invention is depicted schematically in block form in FIG. 1. Therein, a problem display means 11 serves as a first means for presenting individually, visible manifestations of a plurality of problems of an instruction unit. A correct answer means 13 is correlatively connected with the problem display means 11, as indicated by dashed line 15. A response registration means 17 is employed for registering a response to the problem presented by the problem display means 11. A light source 19 is employed as an illumination means for transmitting light through the correct answer means 13 and the response registration means 17. An evaluation means 21 is movable over the response registration means 17 and the correct answer means 13. The evaluation means 21 monitors the quantity of light transmitted from the light source 19 and passing through the correct answer means 13 and the response registration means 17. If the quantity of light is in one direction from a predetermined quantity, a correct answer is given. For example, if the amount of light passing through the correct answer means 13 and the response registration means 17 is below a predetermined quantity, as by having the correct answer blacked out so that the blacked out section overlies a transparent area on the correct answer means 13, a correct answer 23 is registered. An appropriate correct answer light 25 is energized to indicate to the student that he has given the correct answer. As the evaluation means 21 is moved from over the response registration means 17 and returned to its normal position, an advancing means 27 advances the response registration means 17. Moreover, since a correct answer 23 had been given, the advancing means 27 also advances the problem display means 11 to the next problem. Simultaneously, the correct answer means 13 is advanced to the next answer correlative with the next problem.

A response to the next problem is registered on the response registration means 17 and the evaluation means 21 moved into position to evaluate, or check, the response. In the event the amount of light passing from the light source 19 through the correct answer means and the response registration means is above the predetermined quantity, an incorrect answer 29 is registered and light 31 is energized to apprise the student of his incorrect answer. As the evaluation means 21 is returned to its normal position, the advancing means 27 again advances the response registration means 17. Since there has not been a correct answer 23 but has been an incorrect answer 29, the advancing means 27 does not advance the problem display means because it is blocked by repeat means 33. The student may register successive responses and evaluate them by moving the evaluation means 21 into its evaluating position over the response registration means 17 and back to its normal position. Each time there is an incorrect answer, the advancing means 27 advances the response registration means 17, but does not advance the problem display means 11.

In a specific embodiment, an anti-frustration means 35 is employed for effecting advancement of the problem display means 11 after a predetermined number of incorrect answers have been registered. For example, after the student has registered a response for three times and receives three incorrect answers, the anti-frustration means 35 may allow the advancing means 27 to advance the problem display means 11, almost as though a correct answer 23 had been registered. The light 31 will be energized, however, instead of light 25 to apprise the student that the advancement is a result of the anti-frustration means 35 rather than a correct answer 33. Moreover, a time delay means 37 is connected with the evaluation means 21 so as to effect deenergizing of the light source 19 for a predetermined time interval when an incorrect answer is registered. The time interval is short; for example, about 10 seconds. The inability of the student to proceed during this time interval provides a mild negative reinforcement to encourage a student to register a correct answer. In some embodiments, as described hereinafter, there may employed two sources of light; one of which is turned off by the time delay means 37, if energized, and one of which is energized only when the evaluation means 21 is moved over the response registration means 17.

Figure 2:
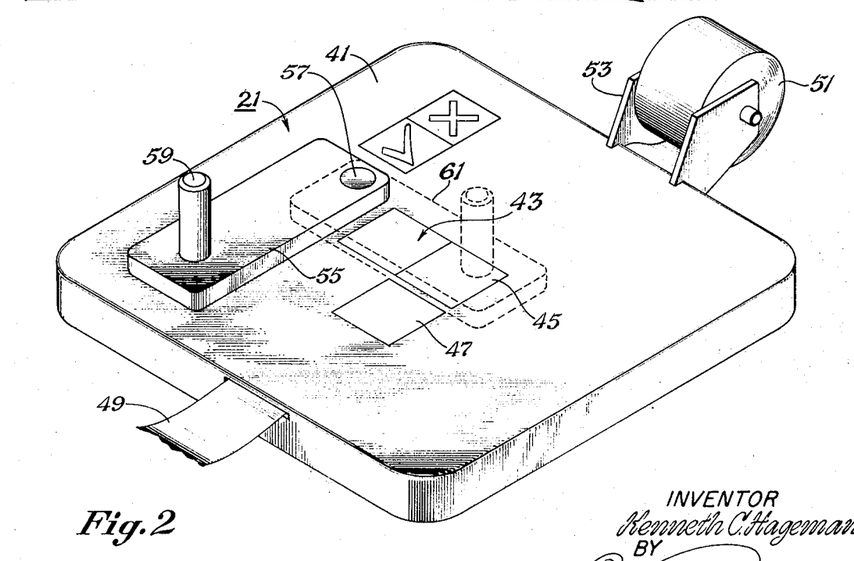
FIG. 2 is an isometric view of a specific embodiment of this invention.

FIG. 2 illustrates an educational device designed to facilitate learning in pre-schoolers through the fourth or fifth graders. This device is consistent with modern conditioning theory and uses these concepts to facilitate learning basic skills by young children. As illustrated, the program text material is contained in a cartridge which is inserted into a machine. In a simple embodiment, the device is employed as an aid in teaching children how to write, to learn to form letters and numerals and to associate these letters or numerals with a displayed image. Basically, the device is a simple one in which the letter to be learned is transilluminated through the paper upon which the child responds by blanking out the light to the extent that the line he writes is formed or imposed upon the transilluminated letter. Following the completion of the response, it is evaluated by a photoelectric cell which discriminates the amount of light transmitted through and around the response and a correct answer area. If the amount of light is large, the discrimination is made and the machine responds by having the child repeat the same letter, since the answer would be incorrect. Moving the photocell from its position for evaluation back to normal moves the paper and, following a correct answer a strip means containing the letter, number, or other geometric symbol for problem display. Following each response, the paper is always moved. The film is moved only if the child's response is correct; in the absence of an anti-frustration means.

Referring to FIG. 2, a housing means such as cabinet 41 encloses the essential elements. Cabinet 41 has a substantially flat upper surface area that facilitates writing. It has a problem display area 43 and a transparent response area 45. It also has a window 47 which will show the previous response when the response registration means, comprising paper 49, is advanced. The paper 49 on which a correct answer will be written may be stored in a roll 51 rotatably mounted on a suitable bracket 53. The paper 49 is at least translucent to light and is disposed over the response area 45 for registration of a response, or answer, by the student.

The evaluation means 21 comprises a checking arm 55 housing a conventional photoelectric cell (not shown). The checking arm 55 is pivotally mounted on a first shaft means such as shaft 57. The checking arm 55 is readily moved over the response area 45 by the student's pulling downwardly on handle 59. As illustrated in dashed lines 61, the checking arm 55 is pulled downwardly to emplace the photoelectric cell over the response area 45.

Figure 3:
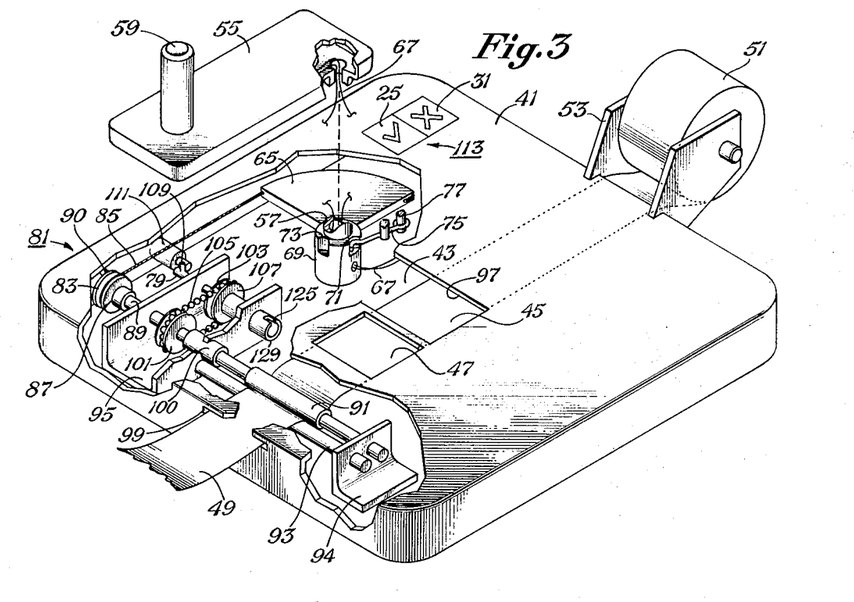
FIG. 3 is an isometric view, partly cutaway, showing the interconnected elements of the embodiment of FIG. 2.

Referring to FIG. 3, the checking arm 55 has been moved upwardly for clarity in illustrating the mechanical components on the interior of cabinet 41. The checking arm 55 is connected to shaft 57 so as to rotate shaft 57 as the checking arm 55 is pivoted. Shaft 57 has a bell crank 65 connected thereto so as to rotate as shaft 57 is rotated. Shaft 57 is hollow and has a pair of conductors 67 communicating intermediate the light responsive evaluation means (not shown) in the free end of checking arm 55 and the decision circuit described hereinafter. The shaft 57 has an enlarged base portion 69 having a pair of detents 71 and 73 therein. A detent spring 75 is connected with the cabinet by way of suitable pins 77. The free end of detent spring 75 engages the detents 71 or 73 for retention of the checking arm 55 in either its normal position, as illustrated in FIG. 3, or in its evaluation position, illustrated by dashed lines 61 in FIG. 2.

The bell crank 65 is drivingly connected with a second shaft means 79 by way of a transmission means 81, including flexible lineal member 85. Specifically, the bell crank 65 is connected with a sheave 83 by way of a flexible lineal member 85. The flexible lineal member 85 may be a suitable string, wire, cable, or chain which is fixed at one end to the bell crank 65 and rides in a groove-like configuration around the periphery of the bell crank. The other end is connected to the sheave 83 which is mounted on a one way clutch 87. The clutch 87 is, in turn, mounted on the paper drive shaft 89. One end of a torsion spring 90 is attached to the sheave 83 and the other end to the body of the machine to act as a rewind device for the sheave 83. For example, as checking arm 55 is moved from its normal position to its checking, or evaluating, position, the bell crank 65 is rotated through 90°. As the force on the lineal member 85 is reduced, the spring 90 rotates the sheave 83 90° in a counterclockwise direction, as viewed from shaft 89. As the checking arm 55 is returned to its normal position, the bell crank is rotated through 90° to the right; in turn, causing sheave 83 to rotate in a clockwise direction, and rewind spring 90. The action of the one way clutch 87 permits the sheave 83 to rotate freely in the counterclockwise direction during the downward movement of the checking arm 55; but, during the return stroke, causes the sheave 83, the clutch 87, and the paper drive shaft 89 to rotate in the clockwise direction. The paper drive shaft 89 has an annular frictional pinch roller 91 disposed about its periphery and engaging paper 49 intermediate it and an idler roller 93. The paper drive roller and shaft 89 and the idler roller 93 are retained suitably engaging paper 49 by mounting brackets 94 and 95. Thus, upon rotation, paper drive shaft 89 will advance the paper 49, via friction pinch roller 91. A ratchet clutch 100 is employed intermediate paper drive shaft 89 and mounting bracket 95 to prevent rotation of the shaft in the counterclockwise direction and reversal of the paper.

As illustrated, the paper 49 from roll 51 passes beneath the upper surface of cabinet 41 and over a response area 45. The student may enter his response through window 97. The paper 49 passes under window 47 to show the student what his previous response has been. The paper 49 then passes out a suitable slot 99.

The transmission means 81 also includes a pair of sheaves 101 and 103 and an endless lineal member such as bead chain 105 connected therebetween. Sheave 103 operates to rotate the second shaft 79 through a slip clutch 107. The slip clutch 107 allows the sheave 103 to rotate slippingly on the second shaft 79 when rotation of the second shaft 79 is blocked by engagement of a suitable means such as latch stop pin 109 with the plunger of solenoid 111. The second shaft 79 will rotate only when the plunger of solenoid 111 has been disengaged from the latch stop pin 109. The latch stop pin 109 serves, not only as a stop mechanism, but also as an indexing mechanism for second shaft 79. The solenoid 111 is operable to retract its plunger and allow the second shaft 79 to rotate when energized by suitable output from the decision circuitry, as described hereinafter. The second shaft 79 is operable to drive a suitable shaft and advance a problem display means in a suitable cartridge. On the other hand, when pin 109 encounters the plunger of solenoid 111 and the slip clutch 107 allows the sheave 103 to operate without rotating the second shaft 79, the problem display means is not advanced. Any suitable gear train, or pair of gears and pair of worm gears with an intermediate shaft, may be employed instead of sheaves 101, 103 and endless lineal member 105, if desired.

An apprising means 113 is employed to apprise the student of the correctness or incorrectness of his answer, as indicated hereinbefore. For example, the light 25 may be energized to tell the student that his answer was correct, whereas the light 31 may be energized to tell the student that his answer was incorrect. The apprising means 113 may comprise a green light or check mark for an acceptable response and a red light or x-mark for an unacceptable response; or any suitable combination of lights or lack of lights.

Figures 4, 5, 6:
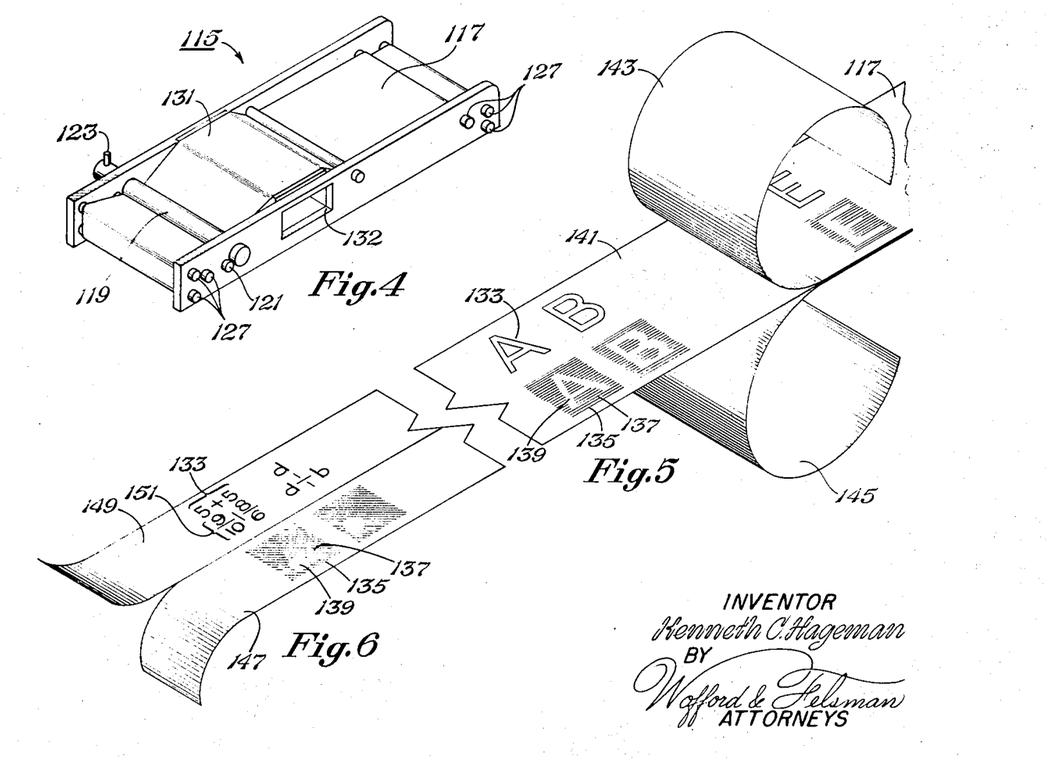
FIG. 4 is an isometric view of a cartridge means employed in the embodiment of FIG. 2.
FIG. 5 is an isometric view of a strip means employed in a cartridge means in accordance with one embodiment of this invention.
FIG. 6 is an isometric view of a section of a strip means in accordance with another embodiment of this invention.

FIG. 4 illustrates a cartridge means such as cartridge 115. The cartridge 115 is employed to hold and advance a pre-programmed series of problems of a problem unit. For example, the problems may be delineated on a film 117 which may be conveniently stored in the cartridge 115. The film 117 is advanced by a suitable problem advance roller 119 which may comprise one of a pair of pinch rollers, the other being idler roller 121; or a sprocket engaging apertures (not shown) in the film; for advancing the film. The pinch roller 119 has a suitable pin means 123 for engaging a slot 125, FIG. 3, for advancing the film. The film itself may be an endless loop of film or it may be passed over suitable rolls. As illustrated, it is an endless loop of film passing over a plurality of film guide rollers 127 disposed at each end of the cartridge. Any suitable number of rollers may be employed, depending upon the type of film employed. The film cartridge 115 is inserted into the cabinet 41 through an opening or access panel in the bottom of the device. The pinch roller 119 and pin means 123 engage with the slot 125 and hollow shaft end 129, FIG. 3. The cartridge is then snapped into its final position and held there by suitable clamps or locking devices. It may be inserted in any other manner, however, such as being slipped in from the side, top or end, depending upon the conditions under which it will be employed. As illustrated, the area 131 serves as the display and answer areas of the film at the point at which the film passes beneath the upper surface of the cabinet 41 and beneath the problem display area 43. The correct answer display may or may not be apparent to the student depending on the embodiment employed, as explained hereinafter. A side aperture 132 is provided to enable using a variety of light sources to illuminate the problem area for display to the student.

The film 117 is illustrated in FIG. 5. Therein, the film contains both a problem display 133 and a correct answer display area 135. The correct answer display area 135 has a subarea 137 that is substantially opaque to light and a second subarea 139 that is at least translucent to light. Preferably, the subarea 139 is transparent. Thus, a strip means such as the center layer, or portion, 141 of three layers will have the problem display and the correct answer display area correlatively positioned with the correct answer display area 135 immediately beneath the problem display 133. The center layer 141 may be, for example, a piece of photographic film, such as 70 millimeter (mm) film, which has been exposed and developed. After exposure, the center portion 141 is laminated between two layers of clear plastic; for example, Mylar plastic strips 143 and 145.

Other forms of problem display and construction may be employed. For example, in FIG. 6, the center layer may comprise a strip of exposed and developed photographic film 147, such as 35mm film, containing the correct answer display area 135. The problem display strip 149 may comprise one of a variety of thin materials basically similar in thickness to film 147; for example, paper, or Mylar plastic. The problem display 133 is suitably imprinted on the problem display strip 149. As illustrated, the problem 5+5 is imprinted across the top and a plurality of answers are imprinted immediately below the problem to allow the student a multiple choice area 151. The correct answer area 135 may, for example, have an opaque subarea 137, covering substantially the entire answer area except for the quarter in which the correct answer is given. The transparent subarea 139 is included in that quarter of the answer display area. As illustrated, the problem display strip 149 and the correct answer strip 147 have contiguous edges. They are laminated intermediate two plastic strips like the strips 143 and 145, FIG. 5. The layers may be laminated together by any of the means conventionally employed; for example, by heat and pressure, or by vacuum. The outer layers of plastic afford protection for reusable film. They may be omitted, however, for developmental or temporary strips generated by an individual teacher. One advantage of the construction illustrated in FIG. 6 is that the problems can be written directly onto a strip of material to increase the versatility of the strip and reduce the cost, as well as add increased variety and capability to the educational device. Moreover, instead of a predeveloped strip of answer areas, teachers may form their own strips of answer display areas that correlate with their own problem displays.

Figure 7:
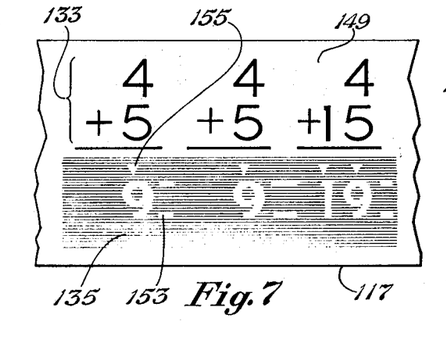
FIG. 7 is a plan view of another section of a strip means in accordance with another embodiment of this invention.

As illustrated in FIG. 7, the film 117 may take another form in which the problem display 133 is formed on a problem display strip 149 but in which the correct answer display area 135 has guidelines 153 and 155. The correct answer display area 135 also has the opaque and transparent subareas described hereinbefore. The guidelines 153 and 155 are employed, however, to guide the student in aligning his answer so as to enable evaluating the answer.

The arrangement of each of the embodiments may be understood by referring to FIGS. 8-11. An illumination means comprising light 159 and light reflection box 161 is employed as a source of light for passing upwardly through the correct answer display area 135 on film 117 and the response area 163 on paper 49. The light that is transmitted is sensed by the light responsive evaluation means 21 in the checking arm 55. If desired, the light source may be located outside the reflection box with light rays suitably directed into this area or directly into aperture 132, FIG. 4, through prisms or mirrors.

Figures 8, 10:
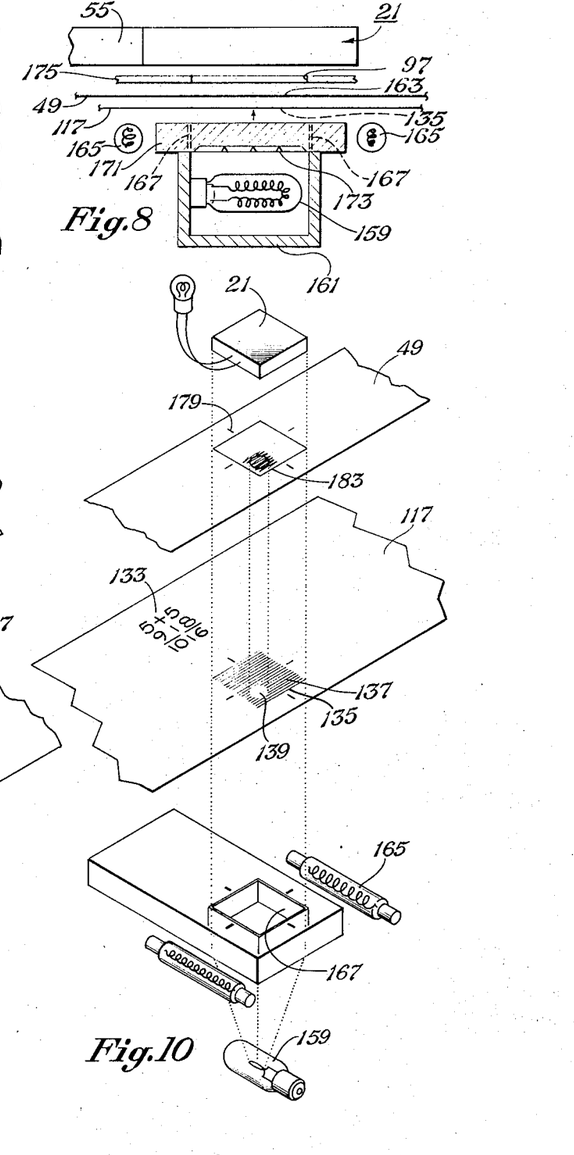
FIG. 8 is a partial cross sectional view of the illumination means and the evaluation means, with the intermediate cover and window, and answer and response areas slightly expanded vertically.
FIG. 10 is a partial exploded schematic isometric view showing the type of answer and the evaluation in accordance with the embodiment of FIG. 6.

A transillumination means illustrated by side lights 165 are provided for edge lighting of the plastic writing table 171. Suitable light barriers 167 allow the side lighting to illuminate the guidelines on the answer area but prevent illumination of the correct answer area from below when the light 159 is not energized. That is, the side lights 165 effect a frame of reference that is projected onto the writing paper 49 to aid the student in properly locating his answers or in orienting his work figures. If desired, the guidelines may be formed by etchings 173 that are projected onto the writing paper 49 in the response area 163, instead of or in addition to guidelines 153 and 155 around the correct answer area 135.

The writing table 171 supports the paper and allows the student to make his response. Specifically, the film 117 overlies the writing table 171. The paper 49 overlies the lower half of the film 117. The cover 175 of the cabinet 41 having a suitable window 97 cut therein, overlies the paper 49 and defines the response area.

Figure 9:
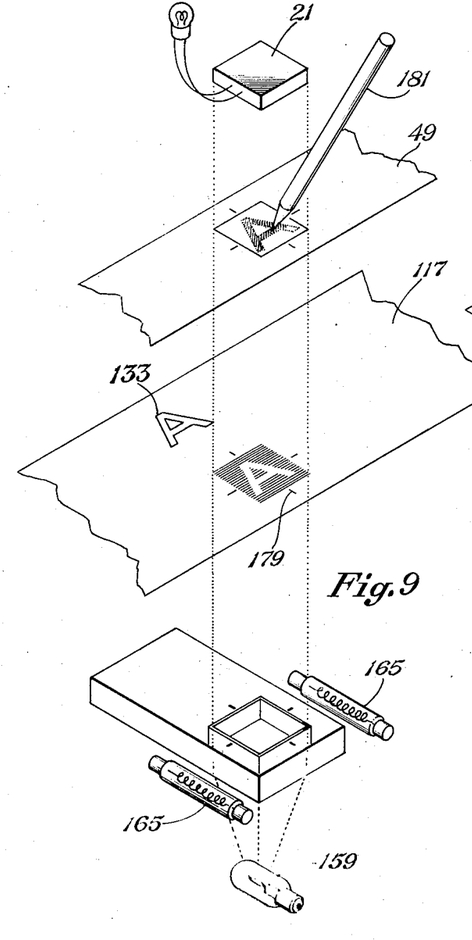
FIG. 9 is a partial exploded schematic isometric view showing schematically the answering and the evaluation in accordance with the embodiment of FIG. 5.

The exploded isometric view of FIG. 9 illustrates the evaluation of the embodiment of FIG. 5. Therein, the problem is to teach the student to develop a writing skill. The lower half of the film 117 includes a shaded area with a silhouette or clear outline of the letter A. The lower half of the film is covered with a writing paper 49. With light 159 energized, the letter A is projected upwardly onto the paper for the student to copy. The letter A is also displayed in the problem display area. Without a light from beneath the film, the student would see the letter A at the top of the film and displayed in the problem display 133 above the writing paper and illuminated by side lights 165. If the light 159 is not energized, it is necessary to give the student some reference points, such as guidelines 179, for starting to form his A. The student, using a stylus 181 such as a felt tip pen or other suitable writing instrument, constructs or writes the letter A on the writing paper. Upon completion of the construction, he pulls the checking arm 55 down as described hereinafter. In pulling the checking arm down, light 159 becomes energized if not already energized. If the student's opaque area on the writing paper 49 coincides with the transparent, or translucent, subarea 139, very little light is transmitted through and the light responsive evaluation means 21 registers a correct answer. If, on the other hand, the student had constructed his letter A erroneously, the light would be permitted to pass through the transparent subarea 139 such that a great deal of light would be sensed by the evaluation means 21 and an incorrect response would be indicated, or registered.

Preferably, the light 159 is energized, particularly during the early periods of teaching the student to form the letter, to help the student. That is, the student not only has the problem display area in which to see the letter A, but also sees the letter A outlined in his response area on the answer paper. In this way, the student learns the correct way to form the letter by tracing it initially. Later, the light 159 can be normally deenergized and energized only on the pulling of the evaluation means 21 over the response area.

Referring to FIG. 10, the light 159 is not energized until the evaluation means 21 is moved into place over the response area. The side lights 165 are energized, however, and illuminate the problem display 133 and the guidelines 179. The light barrier 167 prevents the student from seeing the correct answer area 135 showing the quadrant in which the transparent area 139 is located. The student sees the problem 5+5 in the problem display area. Immediately beneath it are four possible answers, 9, 8, 10 and 6. The instructions are for the student to black out the corresponding portion of the square on the bottom half of the film which correspondes to what he considers to be the correct answer. Accordingly, he blocks out a quadrant of his square, delineated by guidelines 179; for example, the lower left hand quadrant 183, on writing paper 49. When the checking arm 55 is moved into position, if the student has blocked out the portion corresponding to number 10, as illustrated, then the light will be prohibited from passing through the combined response, blackened quadrant 183 on the paper 49, and the opaque subarea 137 to the light responsive evaluation means 21. On the other hand, if he has blocked out some other portion of the square, then the light will pass through the transparent subarea 139, reach the light responsive evaluation means 21; and a signal will be generated indicating that an improper response has been given.

Figures 11, 12, 13, 14, 15:
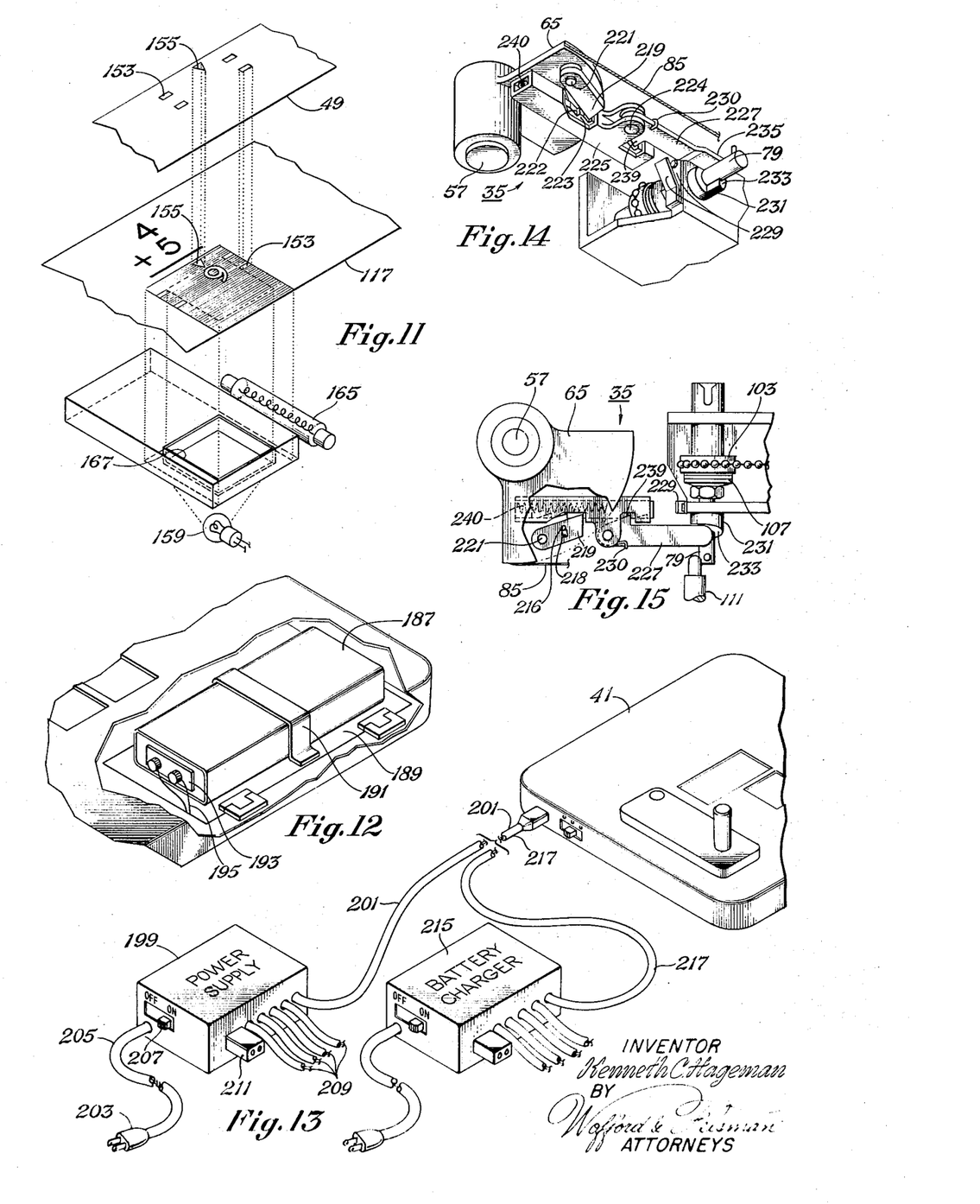
FIG. 11 is a partial exploded isometric view illustrating the illuminated guidelines outside of the answer area, but not the answer area, in accordance with the embodiment of FIG. 7.
FIG. 12 is a partial isometric view, cutaway, showing a portable power source included in the embodiment of FIG. 1.
FIG. 13 is a diagrammatic view of the embodiment of FIG. 1 operable from either a main power supply or with a self-contained power supply such as a rechargeable battery unit with a battery charger.
FIGS. 14 and 15 are respectively, partial isometric and partial plan views of an anti-frustration means employed in one embodiment of this invention.

As illustrated in FIG. 11, the problem 4+5 may be presented in columnar form to the student with suitable guidelines 153 and 155 surrounding the answer area. The student then forms his answer within these guidelines. Again, the checking arm 55 is moved into position, the light 159 energized, and the amount of light passing through the correct answer area and the answer paper is sensed, as described hereinbefore. If too much light passes, an incorrect answer is registered. Otherwise, a correct answer is registered and the problem display means is caused to advance to the next problem display for the student. In all of the embodiments, the light barrier 167 prevents illumination of the correct answer in the correct answer area 135 by side lights 165.

The educational device employs power such as electricity from a suitable power source. To illustrate, the device may have a portable power supply, as illustrated in FIG. 12 so as to be uninhibited by connecting electrical cords. For example, a rechargeable battery 187 may be mounted in a battery compartment to a cover 189 by way of bracket 191. A suitable power connector with suitable terminals, illustrated by snap-on battery terminal connector 193 may be employed for the connection of suitable conductors 195. The conductors 195 may lead to a suitable terminal and should have the capacity to power the elements of the device, as well as to allow recharging of the battery 187. If desired, economical dry cell batteries may be employed instead of rechargeable battery 187.

On the other hand, as illustrated in FIG. 13, the educational device may be connected with a suitable external power supply 199 through suitable cable 201. The power supply 199 may be connected to a suitable power outlet such as a conventional AC outlet by way of plug-in connector 203, cable 205 and on-off switch 207. The power supply 199 may be a central power supply that is employed for powering a plurality of the educational devices, as illustrated by a plurality of cables 209. If desired, a suitable rewind apparatus may be employed to wind cables which are not being used and leave only a plug 211 exposed. If desired, a three-way switch 213 may be employed on cabinet 41 to switch the educational device from the external power supply to its internal battery, or to allow charging of the battery with suitable battery charger 215. If desired, an on-off feature may be incorporated into switch 213, or a separate on-off switch (not shown) may be employed, regardless of which source is employed. For example, a 12 volt nickel cadmium (Nicad) battery may be employed and charged by a suitable 12 volt battery charger 215. In such an event, the cable 217 is plugged into the same receptacle as the cable 201. If desired, a combination power supply and battery charger may be employed with a single cable connection.

An anti-frustration means 35 is illustrated in FIGS. 14 and 15. Therein, a mechanical-electrical means advances the problem display means to the next problem after a predetermined number, such as three, incorrect responses have been registered. An operating pawl 219 is pivotally connected to the bottom side of bell crank 65 as by stub shaft 221. The operating pawl 219 is disposed such that it engages notches 222 in a rack 223 contained in housing 225 at the end of the rotation of the bell crank through its 90° movement. The housing 225 is affixed to the cabinet of the educational device for support. The operating pawl 219 has its pivotal movement limited, however, by pin 216 in slot 218 so it will disengage the notches 222 of the rack 223 upon return of the bell crank to its normal position. This disengagement enables the rack 223 to return to its normal position when released by a latch pawl 227. A latch pawl 227 is pivotally mounted on shaft 224 for engaging the notches 222 of the operating rack 223 and holding it in an attained position. The latch pawl 227 has its free end biased toward a cam means 231 by spring 230. A switch means such as switch 229 is interposed in the path of travel of rack 223 such that after the rack 223 is advanced three times, switch means 229 will be closed. The switch 229 is electrically connected with the solenoid 111 so as to effect energization thereof; and the movement of its plunger out of the way of the pin 109, enables the second shaft 79 to be rotated in response to urging from the transmission means 81, FIG. 3. The cam means 231 which is disposed about the second shaft 79 defines an interior surface 233 that is spirally ascending with respect to its base. Accordingly, as shaft 79 is rotated, the spirally ascending surface 233 raises the outer end 235 of latch pawl 227. In response to this pivotal movement of latch pawl 227, its latch dog 239 is released from the notches 222 of the rack 223; allowing the rack 223 to be returned to its normal position by suitable spring means 240. Likewise, a correct answer anytime before operation of the switch means 229 will effect retraction of the plunger of solenoid 111 and allow rotation of cam 231 and spirally ascending surface 233 to release the latch pawl dogs 239 from the notches 222 of the rack 223.

Figures 16, 17, 18, 19, 19A, 19B, 20:
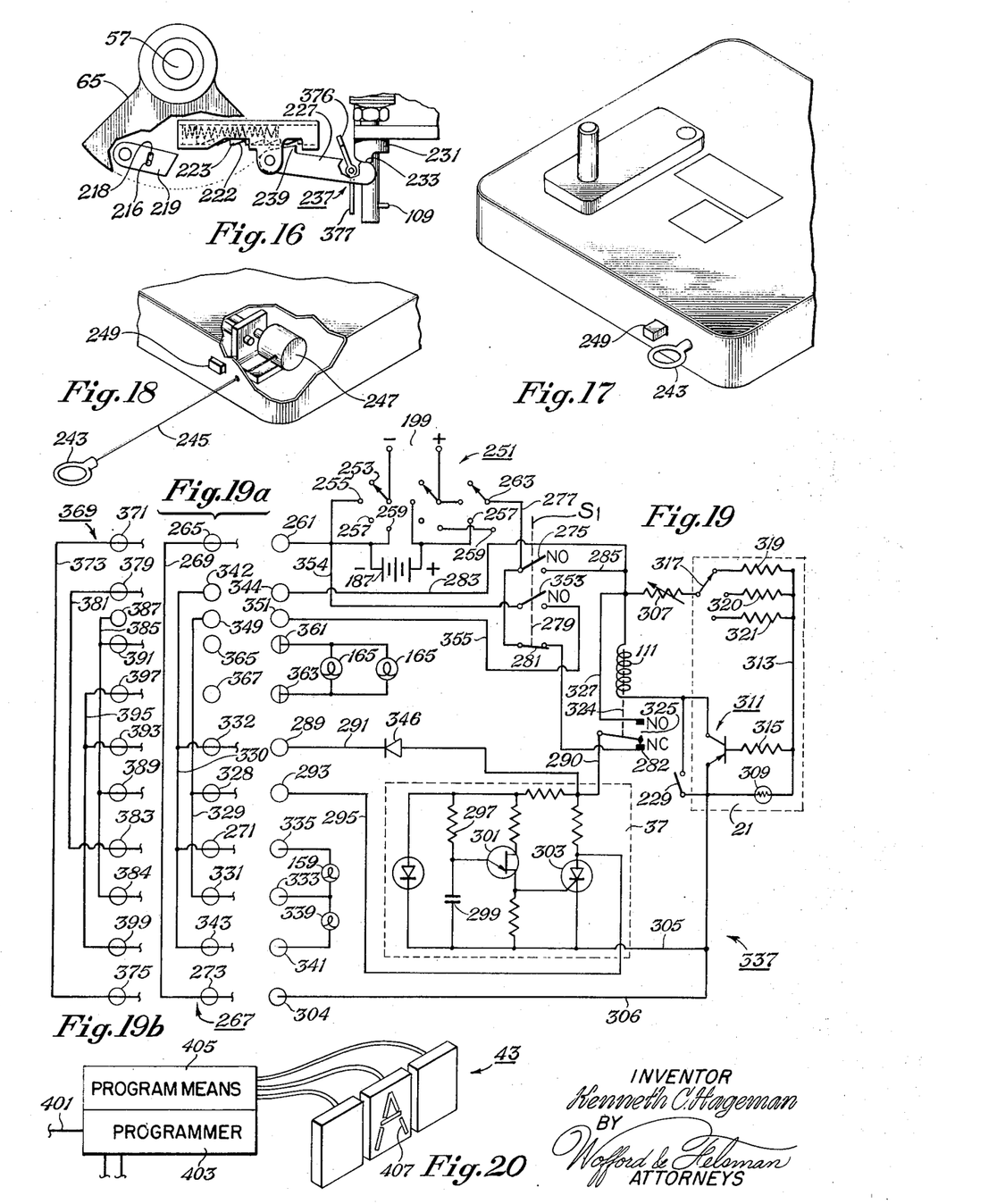
FIG. 16 is a partly schematic, partly plan view of a similar anti-frustration means employed in accordance with another embodiment of this invention.
FIGS. 17 and 18 are isometric views, partly cut-away in FIG. 18 of a reset mechanism employed in the embodiment of FIG. 1.
FIGS. 19, 19a and 19b are schematic, logic and circuit diagrams for respective embodiments of this invention.
FIG. 20 is a partial isometric view illustrating another embodiment of a problem display means.

FIG. 16 illustrates basically the same anti-frustration means as illustrated in FIG. 14 except that a mechanical switch means 237 is employed instead of the electrical switch means 229. Mechanical switch means 237 effects a mechanical release of the shaft 79 by moving end 377 out of the path of pin 109, instead of electrically by way of the solenoid 111. When pin 109 is freed, it allows the second shaft 79 and the cam 231 to rotate so that the spirally ascending surface 233 lifts the latch pawl 227, as described hereinbefore. As can be seen also in FIG. 16, the pawl 219 is limited in its inward travel by pin 216 in slot 218. As illustrated in FIG. 16, the bell crank 65 is rotated about 45° of its 90° of travel.

A rewind means such as illustrated in FIGS. 17 and 18 may be employed to return the film strip to the start position without removing the film cartridge. A suitable ring handle 243 is connected via a lineal member 245 with a rewind mechanism 247. A suitable rewind button 249 is provided for releasing the pin 109 of the second shaft 79 to permit the second shaft 79 and film drive pinch roller 119 to be rotated. The rewind mechanism 247 may be connected onto the end of the film drive shaft, or second shaft 79, for direct rotation. Alternatively, it may be mounted on the end of the paper drive shaft and the rewind button 249 disengage the paper drive pinch roll to prevent needless feeding of the paper. The film rewind mechanism may incorporate a simple position sensing device such as an aperture in the film, or strip means, to detect completion of the film rewind and automatically stop the film at the proper position.

The logic schematic diagram is illustrated in FIGS. 19, 19a and 19b. Therein, a suitable external power supply 199 is connected with the educational device including battery 187. The power supply may be a source of rectified alternating current at a voltage sufficient to charge the battery 187 but not to overcharge it. A three pole three-way switch 251 has two switch arms connected with the power source 199 and connectable with battery 187. The third switch arm is connected with the remainder of the logic circuit and connectable serially with the battery 187 or the power source 199. Accordingly, when switch 251 is in the position shown, with its arms contacting terminals 253, it is off and no power is supplied to the educational device. When moved such that the switch arms connect the contacts 255 the battery 187 is connected with the power source 199 for charging and power is supplied simultaneously to the remainder of the logic circuit. When moved to the contacts 257, the battery is connected into the circuit and the power source is disconnected. If desired, a fourth set of contacts 259 may be employed for the use of the external power source without charging battery 187. Any of the numerous conventional switch arrangements may be employed.

FIG. 19a illustrates a cartridge means such as cartridge, or connector 267 that can be plugged into the educational device, illustrated by the logic circuit in FIG. 19, to effect the embodiment of the invention illustrated in FIGS. 5 and 9.

When the logic circuit is energized, power is connected serially with receptacle 261 and terminal 263. The pin 265 on cartridge 267 engages receptacle 261 and connects the power with conductor 269, and with pin 273. The other side of the power source, illustrated by terminal 263, is connected with a normally open switch 275 and normally closed switch 281 via conductor 277. The switch 275 is closed by a cam on checking arm 55 when the checking arm 55 is swung over the response area for checking the response. Otherwise, switch 275 is open. As illustrated by dashed line 279, normally closed switch 275 by the cam on checking arm 55. The switches 275 and 281 are "make before break" type switches such that the switch 275 is closed first and the switch 281 is thereafter opened when the checking arm 55 is swung into position over the response area. The switch 275 is serially connected with conductor 283 via conductor 285 for connection of power thereto with normally closed switch 282. Switch 282 is serially connected with receptacle 289 via conductors 290 and 291. The switch 282 is also serially connected with the time delay circuit 37. The time delay circuit 37 is also connected with receptacle 293 via conductor 295. Thus, an external load may be supplied power from receptacles 289 and 293 when the time delay circuit has timed out and is conducting. Once rendered conductive, the time delay circuit remains conductive until it is turned off, as by having power denied it.

Basically, the time delay circuit 37 includes a serially connected resistor 297-capacitor 299 (RC) network which takes a predetermined time interval to charge to a predetermined voltage. As illustrated, the time interval is variable from 0.4 milliseconds to 1 minute, depending primarily upon the value of the resistor 297 and the capacitor 299. A unijunction transistor 301 is connected with the juncture of resistor 297 and capacitor 299 for conducting when a predetermined voltage is reached. The unijunction transistor 301 is connected with silicon control rectifier 303 so as to render the silicon control rectifier conductive when the unijunction transistor 301 fires. Silicon control rectifier 303 remains conductive, connecting conductor 295 with the conductor 305 that is connected with the other side of the power source 199. As indicated, the SCR remains conductive until it is turned off, as by having power denied it. Once power is denied the time delay circuit 37 and is then supplied again, the timing interval begins but no conduction occurs until the expiration of the timing interval.

The receptacle 304, which connects with pin 273, is connected with the evaluation means 21 via conductor 306. The evaluation means 21 is also serially connected with conductor 283 via calibration rheostat 307. The evaluation means employs a light sensitive element such as cadmium sulfide photocell 309 to sense the changes in the light level. The photocell 309 is connected with an electronic switch 311 so as to render it conductive when the light is above a certain level and to render it nonconductive when light is below a certain level. Specifically, photocell 309 is serially connected with conductor 306 and conductor 313. The electronic switch may be a silicon controlled rectifier (SCR), or any other switch that may be operated in response to a change in one parameter by the light responsive element such as photocell 309. The electronic switch 311 is also serially connected with conductors 306 and 313 via biasing resistor 315. Accordingly, a given resistance in photocell 309 will render electronic switch 311 conductive whereas resistance below a certain level will retain it in a nonconductive state. Conductor 313 is serially connected with the calibration rheostat 307 by way of a sensitivity switch 317 and a plurality of parallel connected resistors 319—321 of respective values of resistance. The resistors 319—321 enable selecting different levels of sensitivity depending upon the source of light employed as the illumination means and the degree of skill expected of the student in forming the letters with a predetermined stylus.

The solenoid 111 is also connected with conductor 283 and with the electronic switch 311 so as to be energized in response to the state of the electronic switch 311. The conductor 283 is also connected with normally open switch 325 via conductor 327. As illustrated by dashed line 324 the solenoid 111 is operable to open switch 282 and close switch 325. The switches 282 and 325 are the "make before break" type switches wherein the switch 325 is closed before the switch 282 is opened. Consequently, operation of solenoid 111, as by a correct answer, effects closure of switch 325 so that power is not denied either conductor 291 or the time delay circuit 37. Consequently, there is no operation of the time delay circuit 37 and the student may proceed if he answers correctly. If, on the other hand, the switch 281 is opened by movement of the checking arm 55 over the response area and the solenoid 111 remains deenergized, as by an incorrect answer, power is denied the time delay circuit 37. Consequently, when the power is again supplied thereto as by movement of the checking arm 55 back to its normal position, there will be a period of delay before the lights are illuminated and the student can proceed.

The receptacle 293 engages pin 328 for supplying power to conductor 329. Pin 331 is connected with conductor 329 and engages receptacle 333. Light 159 is serially connected with receptacle 333 and receptacle 335. Receptacle 335 engages pin 271. The pin 271 is connected with receptacle 289, via conductor 330 and pin 332 to provide a complete circuit. Accordingly, the light 159 is illuminated when the SCR 303 in the time delay circuit 37 is conductive. If desired, and as illustrated in FIGS. 19 and 19a, an additional display light 339 may be serially connected between conductors 330 and 329 to be energized for illuminating the problem display 133 separately from the illumination means, or light 159. The light 339 is serially connected with receptacle 333 and receptacle 341. The receptacle 341 is connected with pin 343 which is, in turn, connected with the conductor 330 to complete the circuit. To prevent deenergizing the light 159 in the event of an incorrect response, the conductor 330 is connected with the conductor 283 via pin 342 and receptacle 344. Thus, when the checking arm 55 is swung downwardly, closing switch 275, power is supplied to the light 159. A blocking diode 346 is provided in conductor 291 to prevent the power from being supplied to the time delay circuit 37. To prevent the SCR 303 in the time delay circuit 37 from remaining conductive, the ground, or negative side of the illustrated power source 199 is connected with conductor 329. Specifically, the conductor 329 is connected with pin 349. The pin 349 engages the receptacle 351. A normally open set of contacts, or switch, 353 is serially connected with the negative side of the power source and with the receptacle 351 via conductors 353 and 355. The normally open contacts 353 are closed simultaneously with switch 275 so that both power and ground are supplied to the light 159 and, if employed, display light 339. Sufficient resistance is employed in the conductor 295 to ensure that the SCR 303 is rendered nonconductive via the supplying of both power and ground directly to the light 159. Accordingly, when power is denied the time delay circuit 37, as by an incorrect answer, the SCR 303 is rendered nonconductive and the time delay circuit 37 will function for its intended purpose, described hereinbefore.

As illustrated, the side lights 165 are serially connected with receptacles 361 and 363. The receptacles 361 and 363 engage pins 365 and 367 respectively. The pins 365 and 367, however, are not connected with a source of power so the side lights 165 are not energized when the cartridge 267 is plugged into the logic circuitry 337.

If, on the other hand, an incorrect answer has been registered, the repeat means 33 is brought into play. Specifically, solenoid 111 is not energized. Consequently, its plunger blocks the rotation of pin 109 and prevents rotation of second shaft 79. Furthermore, the switch 325 remains open and power is denied switch 282 by opening switch 281 by cam operated switch $S_1$ on checking arm 55. As a result, the time delay circuit 37 is denied power and will prevent energizing any of the lights for the predetermined time interval after the evaluation means 21 is moved from over the response area 45. After expiration of the timing interval, the appropriate lights are reenergized. The same problem, however, remains illuminated in the problem display area 33.

Referring to FIGS. 19 and 19a for the specific operation, the normally opened switch 275 is closed when checking arm 55 is moved downwardly into its checking position with the evaluation means positioned over the response area. Accordingly, power is supplied to conductor 283 and to solenoid 111. Whether or not solenoid 111 is energized conductive depends upon the magnitude of light sensed by the photocell 309. If a correct answer is registered, as by registration of a very small amount of light, the solenoid is energized through the rendering conductive of the electronic switch 311. Consequently, switch 325 is closed and power continues to be supplied to conductor 291 and time delay circuit 37 to maintain the illumination light 159 energized and, if employed, the problem display light 339 energized.

With the cartridge 369, FIG. 19b, inserted, when the checking arm 55 is moved downwardly to this checking position, power is supplied; via switches 275 and 353, conductors 283, 381, 385, 355 and 353, and pins 379, 383, 384 and 387 to energize illumination light 159 which has theretofore been deenergized.

If an incorrect answer is registered, the solenoid 111 will not be energized; since, as indicated hereinbefore, the electronic switch 311 will not be rendered conductive because of the cadimum sulfide photocell 309 senses too much light being transmitted through the correct answer area and the response area. The switch 325 remains open and does not conduct power from conductor 327 to conductor 291 and the time delay circuit 37. Power is denied the side light 165 as well as the display light 339. Moreover, when the student moves the evaluation means 21 from over the response area 45 and restores power by closing switch 281, the time delay circuit 37 will not become conductive until expiration of the predetermined time required to charge the capacitor 299 to the voltage sufficient to fire the unijunction transistor 301 and render the SCR 303 conductive. The student cannot proceed, because the lights remain deenergized and prevent the problem from being displayed. Even when the lights come on again the same problem is illuminated, as indicated, and the student makes another response to the same problem. Again, the student pulls downwardly on the checking arm 55 and the amount of light passing through the correct answer area 135 and the response area 45 is checked ad an incorrect or correct answer is registered.

If a correct answer is registered, the sequence of events described hereinbefore occurs and the problem display means 11 proceeds to the next problem. If an incorrect answer is registered the repeat means 33 is brought into play as described hereinbefore and the problem display means does not advance. After a predetermined number of incorrect answers; for example, three incorrect answers; the anti-frustration means 35 comes into play. For example, as illustrated in FIGS. 14 and 15, the operating pawl 219 will have advanced the rack 223 each time an incorrect answer is made. Rack 223 will, after a predetermined number of incorrect answers, close the switch means 229. The closing of switch 229 will energize the solenoid 111. The solenoid 111 withdraws its plunger, enabling the second shaft 79 to rotate. Rotation of shaft 79 and cam 231 lifts the latch pawl 227 by spirally ascending surface 233. When the latch pawl 227 is lifter, the dog 239 releases notch 222. Since the operating pawl 219 will have already been disengaged by the returning bell crank 65, as illustrated in FIG. 16, the spring 240 returns the rack 223 to its normal position, at the left in FIG. 15. If desired, a separate solenoid may be employed for actuation of the switches 282 and 325 so that closure of the switch 229 merely allows the problem display means to advance to display the next problem. Such a separate solenoid need not be energized by the closure of switch 229 and would consequently allow the time delay means 37 to provide the negative reinforcement after the predetermined number of incorrect answers even though the problem display means were advanced. Ordinarily, this is not necessary and a single solenoid 111 will suffice.

When the mechanical switch 237 is employed, as illustrated in FIG. 16, its lower end 377 is moved, to the left as illustrated, by depression of end 376. Consequently, the pin 109 is free to rotate, allowing the second shaft 79 to rotate and advance the problem display means.

The student proceeds on through the number of problems in a given instruction unit. Before the student returns the educational device to its rack, however, he may rewind the problem display means, as by rewinding the cartridge for the next class. Specifically, referring to FIGS. 17 and 18, the student depresses the rewind button 249 and pulls outwardly on ring handle 243. The rewind mechanism 247 is activated, to rotate the second shaft 79 and return the cartridge 115 to its starting position. Several pulls and releases of the ring 243 outwardly may be required to completely rewind the cartridge to its starting position.

GENERAL

The educational device has been described hereinbefore with respect to employing a strip means with the problem and correct answer correlatively positioned thereon with suitable illumination from below. If desired, however, the problem display means and the answer display area may comprise a suitable computer output such as from a computer through a conductor 401 to a programmer 403. The term "cartridge means" is employed herein to encompass the information-containing means for programming such a computer; including but not limited to magnetic tape reels, pinched card decks, and magnetic discs. The programmer 403 is serially connected via a program means 405 to the problem or answer display such as problem display area 43. The problem display and the answer display may comprise, instead of an illuminated transparency, suitable visible display; such as a plurality of lights 407, light-emitting diode matrices (LID), or neon gas tube display. Several such visible displays are commercially available; for example, from Penlights, Inc., Fairfield, New Jersey. The programmer may be connected into the circuit, as illustrated in FIG. 1, to respond to correct and incorrect answers and advance the problem display to the next problem. The answer display area has an opaque subarea and a lighted subarea and is disposed on the side of the response area opposite from the evaluation means. Accordingly, if the student writes a correct answer, the light from the lighted subarea is blocked from the evaluation means as described hereinbefore.

Other specific embodiments will occur to one skilled in the art, once he has studied the embodiments described hereinbefore. Such embodiments are envisioned to be within the scope of this invention if they operate substantially as described hereinbefore and employ an evaluation means that is responsive to the predetermined and absolute level of light transmitted through a response area from a lighted subarea of a correct answer display area.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. An apparatus for presenting problems, questions or the like comprising:
    a. first means (11) for presenting individually, visible manifestations of a plurality of problems or questions (133);
    b. second means (13) for presenting answer areas (135) that correspond respectively and correlatively to said problems (133), said answer areas (135) having an opaque subarea (137) and a lighted subarea (139), a light source from which light is beamed toward a response area (45) where a response will be registered;
    c. a response area (45) for registration of a response to each problem; said response being made by affecting the light transmission properties of a portion within said response area such that a quantity of light from said lighted subarea (139) of said answer area (135) that is a function of the correctness of the response is passed through said response area (45);
    d. alignment means (165, 153, 157, 179; 159, 173) for effecting visible guidelines (153, 155, 179) such that said response, if correct, is aligned with its corresponding and correlative subarea (139) on said answer area (135); and
    e. evaluation means (21) for evaluating correctness of a response in said response area (45) and including a light sensitive device (309), said evaluation means being stored in a normal position on said apparatus and movable to an evaluation position over said response area for sensing the quantity of light passing through said response area (45); said evaluation means (21) being connected with apprising means (113, 25, 31) for registering a correct response if said quantity of light is in one quantum direction from a predetermined quantity and registering an incorrect response if said quantity of light is in the other quantum direction from said predetermined quantity; said response area (45) and said answer area (135) being alignedly disposed with said response area (45) intermediate said evaluation means (21) in said evaluation position and said answer area (135).

2. The apparatus of claim 1 wherein said lighted subarea (139) of said second means (13) is an area that is at least translucent to light and an illumination means (19, 159, 161) is provided for transmitting light through aligned at least translucent portions and subareas of said response area (45) and said answer area (135).

3. The apparatus of claim 2 wherein response registration means (17, 49) is provided over said response area (45), said response registration means (17, 49) being at least translucent for transmission of light therethrough and a third means (27) is provided for advancing said response registration means.

4. The apparatus of claim 3 wherein said third means (27) is connected with said evaluation means (21) and said response registration means (17, 49) such that it advances said response registration means in response to movement of said evaluation means (21) to said evaluation position over said response area and back to said normal position.

5. The apparatus of claim 2 wherein said first and second means (11, 13) are responsively connected with said evaluation means (21) so as to advance to a next succeeding problem and answer when a correct response is registered.

6. The apparatus of claim 5 wherein said first and second means (11, 13) comprise a problem area (133) and an answer area (135) correlatively positioned on a movable means (117) and a fourth means (119, 27) is connected with said movable means (117) and said evaluation means (21) so as to effect advancing of said movable means (117) responsively to said registration of a correct response sensed by said evaluation means (21).

7. The apparatus of claim 5 wherein said first and second means (11, 13) are connected with said evaluation means (21) via a repeat means (33) that prevents advancing to a next succeeding problem and answer when a first incorrect response is registered.

8. The apparatus of claim 7 wherein an anti-frustration means (35) is responsively connected with said repeat means (33); and said first and second means (11, 13) such that said anti-frustration means (35) neutralizes said repeat means (33) and effects advancing to a next succeeding problem and answer after a predetermined number of incorrect responses are registered.

9. The apparatus of claim 2 wherein a power source (187, 199) is connected with said apparatus and said illumination means (159) is energized by appropriate electrical connections from said power source.

10. The apparatus of claim 2 wherein a transilluminating means (165) is provided for presenting a visual display of each said problem and for illuminating the guidelines (153, 155, 179) in which a response is to be given for comparison with said answer area (135).

11. The apparatus of claim 2 wherein said first means includes a programmer (403), program means (405) and electrical display (43) for electronically displaying said problems.

12. The apparatus of claim 2 wherein said first and second means (11, 13) include a programmer (403), program means (405), and electrical display (43) for electronically displaying said problems and the answers on said answer areas (135) corresponding to said problems.

13. An apparatus effecting programmed instruction comprising:

a. housing means (41), for enclosing elements of said apparatus, having a substantially flat upper surface area facilitating writing and having a transparent response area (45) and a problem display area (43);

b. first means (11) for presenting individually, visible manifestations of a plurality of problems (133) of an instruction unit; said first means (11) including at least a first portion (149) of a preprogrammed, insertable first cartridge means (115) for sequentially displaying said plurality of problems, and advancing means (27) for advancing said first cartridge means upon registration of a correct response in said response area;

c. second means (13) for presenting answer areas (135) that correspond respectively and correlatively to said problems, said answer areas having an opaque subarea (137) and a lighted subarea (139), a light source from which light is beamed toward said response area (45), each said answer area (135) aligning with said response area (45) for checking the correctness of a response; said second means (13) including at least a portion (147) of a pre-programmed insertable cartridge means for sequentially displaying said answer area; said at least a portion of said insertable cartridge means being responsively connected with said first portion (149) of said first cartridge means (115);

d. response registration means (17), for receiving a response thereon, that is at least translucent to light and disposed in said response area (45); said response registration means being adapted for registration of respective and individual responses, at least one for each problem; said response being made by affecting the light transmission properties of a portion of said response registration means such that a quantity of said light from said lighted subarea (139) of said answer area (135) that is a function of the correctness of the response is passed through said response registration means;

e. alignment means (165, 153, 155, 179); (159, 173) for effecting visible guidelines (153, 155, 179) such that said response, if correct, is aligned with its corresponding and correlative subarea (139) on said answer area (135); and f. evaluation means (21) for evaluating correctness of a response in said response area and including a light sensitive device, said evaluation means being stored on said apparatus in a normal position and movable to an evaluation position over said response area (45) for sensing the quantity of light passing through said response area (45); said evaluation means (21) being connected with apprising means (113; 25; 31) for registering a correct response if said quantity of light is in one quantum direction from a predetermined quantity and registering an incorrect response if said quantity is in the other quantum direction from said predetermined quantity; and g. third means (27) connected with said response registration means (17) and said evaluation means (21) such that it advances said response registration means (17) each time said evaluation means (21) is moved over said response area and returned to its normal position.

14. The apparatus of claim 13 wherein said lighted subarea (139) of said second means (13) is an area that is at least translucent to light and an illumination means (19, 159) is provided for transmitting light through aligned at least translucent portions and subareas of said response area (45) and said answer area (135) at least when said evaluation means (21) is moved over said response area (45).

15. The apparatus of claim 14 wherein a light source (159) is employed for effecting a visual display of each problem from said first portion (147) of said first cartridge means (115) on said problem display area (43).

16. The apparatus of claim 15 wherein said first cartridge means (115) contains a strip means (117) with both the problems and respective answers thereon, and a transillumination means (165) is employed as said light source displaying said problem and illuminatingly delineating response area guidelines (153, 155, 179); and said first cartridge means (115) contains a means (119) drivingly engaging said strip means (117) for advancing said strip means (117) and disconnectably connectable with said advancing means (27).

17. The apparatus of claim 16 wherein said evaluation means (21) is mounted on a first shaft means (57) and said advancing means (27) comprises a bell crank (65) responsively connected with said first shaft means (57) and drivingly connected with a second shaft means (79) via a transmission means (81); said transmission means (81) being responsively connected with said evaluation means (21) so as to effect rotation of said second shaft means (79) in response to pivotal movement of said bell crank (65) and registration of a correct response.

18. The apparatus of claim 17 wherein said transmission means (81) includes a repeat means (33) that prevents rotation of said second shaft means (79) upon registration of a first incorrect response.

19. The apparatus of claim 18 wherein said transmission means (81) comprises a slip clutch means (107) and said repeat means (33) comprises a blocking solenoid means (111), said blocking solenoid means (111) being disengaged to permit rotation upon said registration of said correct response.

20. The apparatus of claim 18 wherein an anti-frustration means (35) is responsively connected with said repeat means (33) and connected with said first and second means (11, 13) such that it neutralizes said repeat means (33) and effects advancement to a next succeeding problem and answer after a predetermined number of incorrect responses are registered.

21. The apparatus of claim 20 wherein said anti-frustration means (35) comprises a ratchet rack means (223) that is positioned adjacent a switch means (229, 237) and a ratchet engaging means (219, 227) for advancing said ratchet rack means (223) each time said evaluation means (21) is moved over said response area (45) and back to its normal position and a correct response is not registered; said ratchet rack means (223) being disposed so as to actuate said switch means (229, 237) after a predetermined number of incorrect responses; said switch means (229, 237) being connected with said repeat means (33) so as to operate said advancing means (27) as if a correct response had been registered after said predetermined number of incorrect responses.

22. The apparatus of claim 14 wherein said response registration means (17) comprises paper (49) and a paper advance means (65, 81, 89) is provided for advancing said paper (49); said paper advance means (65, 81, 89) being connected with said evaluation means (21) so as to advance said paper each time said evaluation means (21) is moved over said response area (45) and back to its normal position.

23. The apparatus of claim 22 wherein said evaluation means (21) is mounted on a first shaft means (57) and said paper advance means (65, 81, 89) comprises a bell crank (65) responsively connected with said first shaft means (57) and drivingly connected with a paper drive roller means (89, 91).

24. The apparatus of claim 23 wherein said paper drive roller means (89, 91) comprises a paper drive shaft (89) having a sheave means (83) that is connected with said bell crank (65) via a flexible lineal member (85), and having a plurality of pinch rollers (91, 93) frictionally engaging said paper.

25. The apparatus of claim 14 wherein said illumination means (113, 159, 161), is energized only when said evaluation means (21) is moved over said response area (45).

26. The apparatus of claim 14 wherein said first means (11) is connected with a time delay circuit means (37) for interrupting the display of a problem on said display area (43) for a predetermined interval of time after said evaluation means (21) has been moved over said response area (45), registered an incorrect response, and returned to its normal position.

27. The apparatus of claim 14 wherein a logic connector cartridge (267, 369) engages matching logic circuit connectors carried by said housing means (41); said logic connector cartridge (267, 369) effecting a logic circuit commensurate with the difficulty level and subject matter of said insertable first cartridge means (115).

28. The apparatus of claim 27 wherein said first cartridge means (115) is designed for teaching writing skills and said logic circuit maintains said illumination means (159) nominally energized.

29. The apparatus of claim 27 wherein said first cartridge means (115) is designed for teaching advanced skills and subject matter and said logic circuit effects energizing of said illumination means (159) only when said evaluation means (21) is moved over said response area.

* * * * *